US012041396B2

(12) United States Patent
Moser

(10) Patent No.: US 12,041,396 B2
(45) Date of Patent: Jul. 16, 2024

(54) SYSTEMS AND METHODS FOR PROCESSING DATA PROXIMATE TO THE POINT OF COLLECTION

(71) Applicant: R9 LABS, LLC, Alexandria, VA (US)

(72) Inventor: Ryan Moser, Alexandria, VA (US)

(73) Assignee: R9 LABS, LLC, Alexandria, VA (US)

( * ) Notice: Subject to any disclaimer, the term of this patent is extended or adjusted under 35 U.S.C. 154(b) by 432 days.

(21) Appl. No.: 17/378,095

(22) Filed: Jul. 16, 2021

(65) Prior Publication Data
US 2022/0021953 A1 Jan. 20, 2022

Related U.S. Application Data

(60) Provisional application No. 62/705,797, filed on Jul. 16, 2020.

(51) Int. Cl.
H04Q 1/18 (2006.01)
H04Q 9/00 (2006.01)
H04L 67/12 (2022.01)

(52) U.S. Cl.
CPC ............ H04Q 1/18 (2013.01); H04Q 9/00 (2013.01); H04L 67/12 (2013.01); H04Q 2209/30 (2013.01)

(58) Field of Classification Search
None
See application file for complete search history.

(56) References Cited

U.S. PATENT DOCUMENTS

| 6,014,517 A * | 1/2000 | Shagam ............... G06F 8/70 717/115 |
| 9,547,598 B1 * | 1/2017 | Karnowski ......... G06F 3/0608 |
| 9,576,039 B2 | 2/2017 | Dageville et al. |
| 9,665,633 B2 | 5/2017 | Dageville et al. |
| 9,842,152 B2 | 12/2017 | Dageville et al. |
| 10,019,454 B2 | 7/2018 | Dageville et al. |
| 10,055,472 B2 | 8/2018 | Dageville et al. |
| 10,108,686 B2 | 10/2018 | Dageville et al. |
| 10,274,758 B1 * | 4/2019 | Liu ..................... G02F 1/025 |
| 11,334,815 B1 * | 5/2022 | Buehl ............... G06F 9/44505 |
| 2002/0133504 A1 * | 9/2002 | Vlahos ............... G06F 16/256 |
| 2004/0003049 A1 * | 1/2004 | Daigo ................. H04L 67/12 709/208 |

(Continued)

Primary Examiner — Adam Lee
(74) Attorney, Agent, or Firm — Greenberg Traurig, LLP; Andrew Sommer

(57) ABSTRACT

Systems and methods for processing data near the point of collection are disclosed. An exemplary system includes a control node configured to execute a cluster manager and a storage manager. A plurality of subordinate compute nodes can be configured to execute tasks under the control of the cluster manager. The storage manager can be configured to manage storage of data received by the system across one or more storage devices shared by the plurality of subordinate compute nodes. Data can be received from a device proximate to the system over a local network connection. A network switch within the system can route data between the network interface, the control node, and the plurality of subordinate compute nodes. The system may be sized and configured to be carried by a single person and deployed in a variety of environments even when an Internet connection is unavailable.

26 Claims, 11 Drawing Sheets

(56) References Cited

U.S. PATENT DOCUMENTS

| | | | |
|---|---|---|---|
| 2005/0034466 A1* | 2/2005 | Sato | H05K 7/20281 62/118 |
| 2005/0187977 A1* | 8/2005 | Frost | G06F 16/24532 |
| 2006/0126201 A1* | 6/2006 | Jain | H04L 67/1001 360/15 |
| 2007/0223689 A1* | 9/2007 | O'Brien | G06F 21/72 380/30 |
| 2008/0025221 A1* | 1/2008 | Lipps | H04L 41/08 370/392 |
| 2008/0091810 A1* | 4/2008 | Blinick | H04L 67/1097 709/223 |
| 2008/0242251 A1* | 10/2008 | Kraemer | H04B 7/0408 455/39 |
| 2010/0207635 A1* | 8/2010 | Plagens | B60L 3/0023 324/509 |
| 2013/0201316 A1* | 8/2013 | Binder | H04L 67/12 701/2 |
| 2013/0250505 A1* | 9/2013 | Makley | G06F 1/20 165/104.11 |
| 2013/0254383 A1* | 9/2013 | Wray | G06F 9/5088 709/224 |
| 2013/0332927 A1* | 12/2013 | Tang | G06F 9/45545 718/1 |
| 2014/0279905 A1* | 9/2014 | Muniswamy-Reddy | G06F 3/0683 707/639 |
| 2014/0317438 A1* | 10/2014 | Ripoll | G06F 11/2017 714/4.11 |
| 2015/0178110 A1* | 6/2015 | Li | G06F 9/45558 718/1 |
| 2016/0232119 A1* | 8/2016 | Knutson | G06F 13/1663 |
| 2017/0048318 A1* | 2/2017 | Hebert | G06F 3/06 |
| 2017/0220463 A1* | 8/2017 | Malina | G06F 3/0688 |
| 2018/0107215 A1* | 4/2018 | Djuric | G06N 3/08 |
| 2019/0087181 A1* | 3/2019 | Okada | G06F 9/3004 |
| 2019/0213036 A1* | 7/2019 | Mattson | G06F 9/5072 |
| 2019/0220574 A1* | 7/2019 | Shah | H04L 67/51 |
| 2019/0362222 A1* | 11/2019 | Chen | G06F 11/3476 |
| 2019/0391587 A1 | 12/2019 | Uvarov et al. | |
| 2020/0105376 A1* | 4/2020 | Lai | G16B 50/30 |
| 2020/0112456 A1* | 4/2020 | Sawada | G05B 19/05 |
| 2020/0167340 A1 | 5/2020 | Cseri et al. | |
| 2021/0019196 A1* | 1/2021 | Geffin | G06F 9/5016 |
| 2021/0055915 A1* | 2/2021 | Guo | G06F 3/0482 |
| 2021/0067512 A1* | 3/2021 | Polepalli Yeshwanth | H04L 63/10 |
| 2021/0089860 A1* | 3/2021 | Heere | G06N 20/00 |
| 2021/0136147 A1* | 5/2021 | Giassa | H04L 67/1031 |
| 2021/0157622 A1* | 5/2021 | Ananthapur Bache | G06F 11/3495 |
| 2021/0215491 A1* | 7/2021 | Liu | H04W 4/40 |
| 2021/0328858 A1* | 10/2021 | Asveren | H04L 61/5007 |
| 2023/0222006 A1* | 7/2023 | Zhu | G06F 9/5077 718/104 |

* cited by examiner

{
{"tcollected":"1618195479", "p0":1, "p1":0, "p2":0, "p3":0 },
{"tcollected":"1618195480", "p0":3, "p1":0, "p2":0, "p3":0 },
{"tcollected":"1618195481", "p0":5, "p1":0, "p2":0, "p3":0 },
{"tcollected":"1618195482", "p0":0, "p1":0, "p2":0, "p3":0 }
}

SYSTEMS AND METHODS FOR PROCESSING DATA PROXIMATE TO THE POINT OF COLLECTION

PRIORITY CLAIM

This application alims the benefit of U.S. Provisional Application No. 62/705,797 filed on Jul. 16, 2020, the entirety of which is hereby incorporated by reference.

FIELD

This disclosure relates generally to systems and methods for collecting and processing data outside of a data center environment. More particularly, this disclosure relates to systems and methods for processing data proximate to the point where the data was collected. This disclosure further relates to various tools which can be used in such systems and methods.

BACKGROUND

Data-driven decision-making is commonplace. Vast amounts of data is being collected from various sources continuously. The collected data can be processed to give insights into a variety of real-world conditions. When properly processed and modeled, the collected data can provide end-users of that data key insights.

With the collection of significant amounts of data, network bandwidth considerations, cost, and the movement of collected data through infrastructure owned or managed by a variety of different providers can be time-consuming, costly, and expose the transmitted data to malicious actors, thus giving rise to security concerns. Nevertheless, the general approach to large-scale data collection and processing is to collect data and transmit it to sites such as data centers where a greater amount of processing power can be found in an environment conducive to high performance data processing. For instance, data centers are environmentally controlled and provide a central point of access for data scientists and others to access the processing equipment for maintained, updating, and troubleshooting. This approach to collecting and processing data can be time-consuming and also requires a pre-existing infrastructure of data processing tooling and pipelines coupled with cutting-edge algorithms and artificial intelligence and machine learning models. Such models can take weeks to months to build and train and require large amounts of sample data to accurately make sense of that often time-sensitive data.

Some attempts have been made to move the processing capability out of the data center and into a more portable form-factor. Such attempts have placed rack-mount servers in hard-shell cases. Such solutions are not optimal for various reasons. As with data center processing of data, the creation, deployment, training, and maintenance of models requires experienced personnel to be at the location of the data processing equipment. Special training is generally required to set the equipment up, configure the system to ingest information, and deploy applications to. One example of a system that suffers from these problems is the Snowball by Amazon, which is configured by Amazon to execute certain applications before shipment to the end-user. Such a system lacks flexibility and can be too rigid for deployments subject to changing conditions and data collection needs. The equipment continues to require consumption of a considerable amount of power and the rack servers used limit the portability of the system. Because the processing is designed for a server environment, when removed from a climate-controlled environment these systems operate inefficiently and are prone to failure without adding sophisticated cooling technologies which decrease portability. Attempts to reduce form-factor of these systems there is a significant fall-off in functionality and processing power. Moreover, the ability of these systems to offload or share computing resources with other systems is limited unless an Internet connection is employed to transfer data to data processing centers. In such cases, to obtain a full complement of data processing services a network connection to a centralized processing center, such as an Internet connection to a data center is needed.

Another problem with existing systems is the lack of an interoperability standard for data sources and data ingestion techniques for providing data to applications and models. Therefore, when a data source is identified that does not provide data in an expected format hardware, software, or firmware adjustments must be made to allow processing systems to collect the data and apply models to it.

SUMMARY

This disclosure sets forth solutions to at least some of the above-identified problems with conventional data collection and processing tools, systems, and methods. As described herein, this disclosure relates to machine-implemented techniques for collecting and processing data which can be deployed near the point of data generation. These systems and methods can lead to timely insights into collected data for innumerable potential uses which will be apparent to those skilled in the art based on this disclosure.

According to one example, a system implementation can include a control node configured to execute a cluster manager and a storage manager. A plurality of subordinate compute nodes can be configured to execute tasks under the control of the cluster manager and the storage manager can be configured to manage storage of data received by the system across one or more storage devices shared by the plurality of subordinate compute nodes. In this example, a network interface can be configured to receive data from a device proximate to the system over a local network connection. The system of this example can also include a network switch. This network switch can be configured to route data between the network interface, the control node, and the plurality of subordinate compute nodes.

According to this example, the local network connection can be a wireless local network connection such as a connection using IEEE 802.11 or similar local wireless communication technology.

The system of this example may be configured such that each of the control node, plurality of subordinate compute nodes, the network interface, and the network switch fit into a portable case. In at least some circumstances, the portable case in which the system is disposed may be carried by a single person by one or more handles attached to the case.

According to another aspect, the system may include a heat management sensor with a temperature sensor, a fan, and at least one heat discharge duct to the exterior of the portable case. The heat management system may be operated under the control of the control node.

According to yet another aspect, the system can include an ignition key port. The ignition key port can be configured to receive an ignition key having a memory space and an encryption key stored in the memory space. When the ignition key is not present, the system does not permit access to the storage devices shared by the plurality of subordinate compute nodes. When the ignition key is present, the system permits access to the storage devices shared by the plurality of subordinate compute nodes.

According to yet another aspect, a system according to this example can include a wide area network connection port. This side area network connection port may allow a user to access a model store having one or more models which can be downloaded to the system for use in processing collected data. The user may be able to browse the model store and identify, select, and download models, which may be containerized models, to be applied to data received from a device proximate to the system over the local network connection. In some configurations, the system can also include a display permitting a user to interact with the system, and, in some embodiments, browse the model store to obtain models.

An additional feature of this exemplary system is that it permits the data received by one or more devices proximate to the system over the local network connection to be aggregated and processed without a connection to a wide area network. Moreover, data received from the device proximate to the system over the local network connection may be aggregated and processed proximate to the point of data collection.

According to certain implementations, the device proximate to the system is a reduced capacity isolatable data aggregation and analytics node ("RC-IDAAN"). The RC-IDANN may be configured such that it includes a control node which is configured to execute a second cluster manager, a second storage manager, and a second plurality of subordinate compute nodes under the control of the second cluster manager. The second storage manager may be configured to manage storage of data received by the RC-IDAAN across storage shared by the second plurality of subordinate compute nodes. The RC-IDAAN may include a network interface configured to interface with a sensor over a personal area network. The network interface may receive sensor data from the sensor, and to transmit sensor data over the local network connection to the isolatable data aggregation and analytics node. The RC-IDAAN may also include a network switch that is configured to route data between the RC-IDAAN's network interface and the RC-IDAAN's control node, and the second plurality of subordinate compute nodes.

According to yet further exemplary implementations, the RC-IDAAN may further be configured to process received sensor data against a model, determine the occurrence of an event, and transmit an indication of the event to a user.

According to certain embodiments, instead of, or in addition to, being connected to a RC-IDAAN, the device proximate to the system may be a sensor and sensor data may be provided to the system from the sensor. Examples of sensors that may be used in connection with the various examples provided herein include an image sensor, a video sensor, a motion sensor, a liquid-level sensor, a gyroscope, a biometric sensor, and a flow-rate sensor. Those skilled in the art would appreciate that a tremendous variety of different types of sensors may be used in connection with the disclosed systems and methods.

Another inventive aspect of this disclosure is a sensor bridge. A sensor, such as the one used in connection with the system mentioned above, may be coupled to the sensor bridge. The sensor bridge may include an analog connection interface. An analog-to-digital converter may be configured to receive analog sensor data. The analog-to-digital converter can then output digital data, which can be incorporated into a data structure representing analog sensor data collected over specified time intervals. The data structure can be agnostic to the type of analog sensor data received. According to this example, the data structure can then be ingested into the system and a model for processing the sensor data may be applied to the data to gain insights into the data according to exemplary systems and methods disclosed herein.

According to certain examples, the system control node can be configured to load a model. The model can be containerized, thus abstracting the model from the hardware and software running on the control node and one or more of the plurality of subordinate compute nodes. Once the model is loaded, its application to data can be orchestrated by the control node such that one or more of the plurality of subordinate compute nodes applies the containerized model against data obtained from the proximate device or otherwise stored in the system.

According to another example, a system can include an isolatable data aggregation and analytics node ("IDAAN") configured to aggregate and analyze data proximate to the point of data collection. The IDAAN can include a first control node configured to execute a cluster manager and a storage manager. The IDAAN can also include a first plurality of subordinate compute nodes configured to execute tasks under the control of the cluster manager. The first storage manager can be configured to manage storage of data received by the isolatable data aggregation and analytics node across one or more storage devices shared by the first plurality of subordinate compute nodes. The IDAAN can include a first network interface configured to interface with one or more devices proximate to the system over a local network connection. The IDAAN can also include a first network switch configured to route data between the first network interface, the control node, and the plurality of subordinate compute nodes.

According to this example, the IDAAN can be configured to interface with a RC-IDAAN as part of the same system. The RC-IDAAN can be configured to interface with a sensor and the IDAAN. The RC-IDAAN can be configured to include a second control node, a second plurality of subordinate compute nodes. The RC-IDAAN's control node may be configured to execute a cluster manager under control of the IDAAN. The RC-IDAAN's storage manager may be configured to manage the storage of data received by the RC-IDAAN across storage shared by the RC-IDAAN's subordinate compute nodes. The RC-IDAAN can also include a second network interface configured to interface with the sensor over a personal area network connection. Sensor data collected by the RC-IDAAN can be transmitted over a local network connection to the IDAAN. The IDAAN may process the data or may store the data, or both store and process the data received from the RC-IDAAN. According to this example, RC-IDAAN can also include a second network interface configured to route data between the RC-IDAAN's network interface, the RC-IDAAN's control node, and the RC-IDAAN's plurality of subordinate compute nodes.

According to certain implementations of this exemplary system, the local network connection can be a wireless local network connection.

According to another exemplary implementation of the system the IDAAN's first control node, first plurality of subordinate compute nodes, the first network interface, and the first network switch are configured to be sized and disposed within a first portable case. The RC-IDAAN's control node, its plurality of subordinate compute nodes, its network interface, and network switch can also be configured and sized to be disposed within a second portable case having a smaller form-factor than the first portable case. In at least some circumstances, the portable case in which the IDAAN is disposed may be carried by a single person by one or more handles attached to the case.

According to other examples of this exemplary system, the IDAAN can include a heat management system including a temperature sensor, a fan, and at least one heat discharge duct to the exterior of the portable case. The heat management system in the IDAAN may be operated under the control of the first control node.

According to other examples of this system, the IDAAN can include an ignition key port. The ignition key port can be configured to receive an ignition key having a memory space and an encryption key stored in the memory space. When the ignition key is not present, the IDAAN does not permit access to the storage devices shared by the plurality of subordinate compute nodes. When the ignition key is present, the IDAAN permits access to the storage devices shared by the plurality of subordinate compute nodes.

According to one exemplary implementation, the IDAAN may be configured to receive data from a sensor and may process the received data against a model proximate to the point of data collection.

According to another exemplary implementation, the RC-IDAAN may be configured to process received sensor data against a model, determine the occurrence of an event, and transmit an indication of the event to a user. According to other examples, the IDAAN may be configured to perform these same functions.

In certain other implementations, the RC-IDAAN may be configured to receive data from a sensor. After the data is received, the RC-IDAAN may transmit the received sensor data to the IDAAN for processing of the sensor data against a model proximate to the point of data collection.

A method according to certain exemplary aspects of this disclosure include receiving data collected by a sensor located proximate to an IDAAN, routing received data within the IDAAN to a process. The routed and received data may be stored in storage managed by a storage manager executed by a second node within the IDAAN. And, the received data may be provided to a compute cluster within the IDAAN, wherein the compute cluster is configured to process the data using a model stored within the isolatable data aggregation and analytics node.

According to certain aspects of the method, the sensor data may be received after being converted into a common format for ingestion by the IDAAN. This may include the use of a sensor bridge for performing the conversion of the sensor data. According to other aspects of exemplary methods, the model applied by a compute cluster within the IDAAN may be downloaded into the IDAAN. According to certain aspects, the model may be downloaded by a user of the IDANN from a model store.

According to other exemplary aspects of the disclosed methods an IDAAN may be powered on. After a power-on sequence has been completed, an IDANN may be interconnected with an RC-IDAAN that has itself been powered on. The interconnection may be made over a network. A process may further include connecting one or more sensors to the RC-IDAAN and/or IDAAN in order to allow for the collection and/or processing of sensor data obtained from the sensor. Additionally, at least one of the RC-IDAAN and the IDAAN may be connected to either a mobile device such as a wearable device to provide notifications in real-time or near real-time regarding the occurrence of events as determined from the processed collected sensor data.

BRIEF DESCRIPTION OF THE DRAWINGS

References are made to the accompanying drawings that form a part of this disclosure and that illustrate embodiments in which the systems and methods described wherein may be practiced. These figures are provided for illustration purposes to allow those skilled in the art to understand particular exemplary implementations of the inventive systems and methods disclosed herein but are not intended to limit the scope of the invention, which is defined by the patent claims and by the entirety of the techniques for improving the functionality of computing equipment disclosed herein.

Like reference numbers represent the same or similar parts throughout.

DETAILED DESCRIPTION

The following detailed description provides a description of specific embodiments to describe to the skilled artisan how to make and use the systems and methods described throughout this disclosure and recited in the various claims. Those skilled in the art will appreciate that the use of specific applications and techniques for implementing specific embodiments is not intended to be limiting and those skilled in the field will be aware of numerous ways to implement the disclosed techniques based on the contents of this disclosure.

Figure 1:
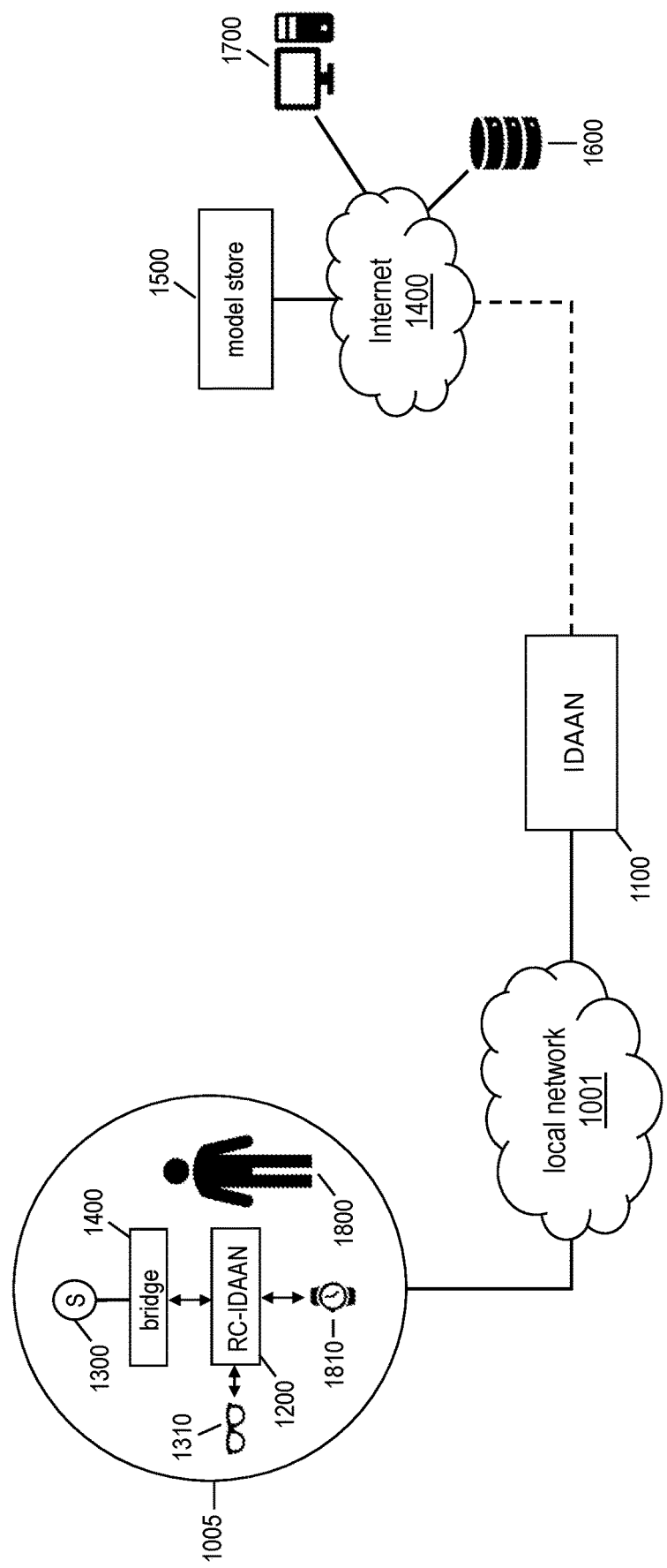
FIG. 1 is an exemplary network in which an IDAAN and an RC-IDAAN may be deployed in accordance with aspects of this disclosure.

FIG. 1 is an exemplary network in which an IDAAN and an RC-IDAAN may be deployed in accordance with aspects of this disclosure. According to this aspect of the disclosure a network arrangement 1000 may be configured to include an IDAAN 1100 which may be configured to be coupled to a local network 1001. In certain examples, the local network may be a wireless local network, such as, for example, an IEEE 802.11 wireless network. An 802.11 network is provided by way of example, but those skilled in the art will appreciate based on this disclosure that other types of local networks may be provided such as mobile ad hoc networks, wireless mesh networks, or even wireless metropolitan area networks, which may include the combination of several wireless local area networks. Such networks may be created on-the-fly and in the field by an operator of the IDAAN or by personnel deploying the system disclosed herein.

IDAAN 1100 may be connected to an RC-IDAAN 1200 via the local network 1001. The IDAAN 1100 may also be connected to the Internet 1004 via a network connection 1003. Network connection 1003 may be any type of network connection that provides access to the Internet and may be a wired or a wireless connection. Network connection 1003 is illustrated as a dashed line in FIG. 1 because it is not needed to operate all aspects of the exemplary systems disclosed herein. In fact, the disclosed systems can perform data collection, storage, and processing without a connection to remote computing equipment 1700 or remote storage 1600 via the Internet 1004 or other network connection.

As shown in FIG. 1, the RC-IDAAN 1200 may be used to create or may otherwise be associated with a personal area network 1005. The personal area network (PAN) 1005 may be a wireless ad hoc network created by the RC-IDAAN 1200 as a master node in the PAN 1005. For instance, the PAN 1005 may be a Bluetooth network. Alternatively, the personal area network 1005 may be created by infrared, induction wireless, ultra wideband (UWB), or ZigBee. Those skilled in the field will understand that a variety of technologies may be employed for the PAN 1005.

In some implementations RC-IDAAN 1200 may be disposed in a storage case and may be carried by a user 1800. For instance, RC-IDAAN may include components that are sized and figured to be disposed in a ruggedized case, such as a wearable backpack, a briefcase, or other portable carrying case.

The RC-IDAAN 1200 may be configured to be coupled through the PAN 1005 or other networking functionality to various devices. For instance, the RC-IDAAN 1200 may be configured to be coupled to eyeglasses 1002 with an embedded video streaming functionality including one or more silicon-based sensors (e.g., a CMOS sensor). The sensor(s) embedded within the eyeglasses 1002 can capture video data and stream that video data over the PAN 1005 for collection and further handling by RC-IDAAN 1200. The RC-IDAAN may also be coupled to another sensor such as a flowrate sensor 1300. The flowrate sensor 1300 may be configured to measure the flowrate of, for example, diesel fuel and provide data in an analog format. A sensor bridge 1400 can be configured to receive analog sensor data. The sensor bridge 1400 can include an analog-to-digital converter, which can be used to convert the analog sensor data into a digital format.

The sensor bridge can be configured to periodically sample the analog sensor output. Depending on the nature of the sensor and the phenomenon being sensed, the sample rate may differ. In some implementations the sampling rate for the sensor bridge will be based on how rapidly the sensed conditions change. For phenomena that change rapidly, the sampling rate may be high while sensing phenomena that change infrequently or slowly, the sampling rate may be lower. Those skilled in the field will appreciate that sampling the flowrate of a fluid such a diesel fuel is just one example of an analog sensor that may be employed in connection with the systems and methods disclosed herein. Indeed, such analog sensors may be equally present in draft beer systems to monitor consumption using the disclosed systems and methods. Sensor data output from sensor bridge 1400 may then be transmitted over PAN 1005.

In alternative configurations, analog sensor 1300 may output data, to an analog-to-digital converter. Digitized sensor data can then be transmitted to the RC-IDAAN 1200, which includes an integrated sensor bridge functionality that receives data over PAN 1005 and converts the received data into a common data format that may be fed into models or stored either in the RC-IDAAN 1200 or the IDAAN 1100 after being transmitted again by the RC-IDAAN 1200 to the IDAAN 1100. In still further alternative implementations, a sensor bridge functionality can be implemented within either or both of the RC-IDAAN 1200 or IDAAN 1100 and can operate on digitized analog sensor data after it has been stored in device storage before it is needed by a model. In this way, the additional sensor bridge processing functionality can be avoided until the data needs to be converted into a common data format, thereby saving processing resources.

RC-IDAAN 1200 may also be configured to be connected with a mobile device, such as, for example, a wearable device like a smart watch 1810. The smart watch 1800 may be configured to execute an application that receives data from the RC-IDAAN 1200 over a communication link such as the PAN 1005 to allow the user 1800 to be made aware of certain events as determined by the processing of sensor data by RC-IDAAN 1200, or, in certain embodiments, by IDAAN 1100 when the data is sent from the RC-IDAAN 1200 to the IDAAN 1100 for processing. According to other embodiments, RC-IDAAN may include cellular communications capabilities and may send notifications to mobile devices such as wearable devices or mobile devices like a mobile phone or tablet over a cellular link, such as an SMS message or other form of written messaging.

The following description provides an exemplary use case for the systems and networks shown in FIG. 1 as applied to a tactical operation to identify and apprehend a suspected criminal. Such a use case shows how law enforcement may be able to use network 1000 during such an operation. Assuming that a suspect is known to be in a crowded, open area without existing CCTV facilities, the system and methods of this disclosure can be employed. What is needed in such a situation is a system and method for identifying the suspect and alerting law enforcement users when the suspect has been identified in real-time or near real time to allow the suspect to be apprehended.

In this case, a user would set up the IDAAN 1100 and deploy an image recognition model that could be obtained form model store 1500. The models need not be obtained from model store 1500 according to this example, but model store 1500 is an available source of pre-approved models that can be used in connection with the IDAAN 1100 and/or RC-IDAAN 1200. The model can be configured to perform facial recognition based on all of the faces in the field of view of images captured by an image sensor. Using pictures of the suspect, the model can be trained to recognize the suspect from a real-time or near real-time image data from a video feed. The IDAAN 1100 can be set up in a nearby building, vehicle, or other place where the suspect is unlikely to see the IDAAN 1100 or nearby law enforcement. The IDAAN 1100 may be in a portable case that may be carried by the user via one or more handles affixed to the case.

The IDAAN 1100 can then be connected with the RC-IDAAN 1200, which can be powered on and connected with eyeglasses 1310 including one or more embedded sensors for collecting and streaming image data to RC-IDAAN 1200. The eyeglasses 1310 may be configured to host a fmpeg stream URL that can be accessed over the network between the RC-IDAAN 1200 and the eyeglasses 1310.

Additionally, smart watch 1810 can be paired with RC-IDAAN 1200. As explained in further detail below, a user can create a new project and provide a name for the project using the IDAAN 1100. The output of the model can be an indication of the occurrence of an event—here, a match of the face of the suspect against the facial recognition model. That output can be communicated from IDAAN 1100 to RC-IDAAN 1200 and then communicated to smart watch 1810. According to other embodiments, the model may run on the RC-IDAAN 1200 without the need to send the collected data to the IDAAN 1100 for processing against the model.

After the user has ensured that the equipment is connected via a dashboard provided on a display of the IDAAN 1100 and the project has been created and model properly installed, a plain clothes officer wearing the glasses can walk through the crowded areas and as the officer does so, data can be collected by eyeglasses 1310, streamed over the PAN to the RC-IDAAN 1200, which may be carried in a backpack or a satchel, for example. Once the RC-IDAAN receives the image data, that data may be transmitted over the local wireless network back to the IDAAN 1100, which is located in close proximity to the officer and the RC-IDAAN 1200. There, the data received into the project may be stored in storage and applied against the facial recognition model. When the model returns a positive hit for recognition of the suspect, a message is transmitted back to the RC-IDAAN 1200 and is then transmitted from the RC-IDAAN 1200 to the smart watch 1310 alerting the officer that the suspect has been identified. This even can also be displayed on the display screen of the IDAAN to notify the operator that the suspect has been identified and provide data associated with the identification of the suspect, thereby allowing dispatch of resources to the scene to apprehend the suspect.

In an alternative implementation, the RC-IDAAN 1200 can process the data against the model installed in the RC-IDAAN 1200 and a notification can be transmitted directly to the smart watch 1310. This can reduce system latency in certain implementations. In another example, after a suspect match is found, a notification can also be transmitted back to the IDAAN 1100 and displayed on the display of the IDAAN 1100 to provide information about the event such as the location of the suspect, an image of the suspect from the image stream, among other information. In some implementations, the RC-IDAAN 1200 may be capturing the video feed from eyeglasses 1310 and sending a stream of that same feed back to IDAAN 1100 even when the RC-IDAAN 1200 is executing the facial recognition model. In this example, IDAAN 1100 may be used to store data associated with the project instead of storing that data in the RC-IDAAN 1200 for further analysis at a later time. According to yet another potential implementation, both the RC-IDAAN 1100 and IDAAN 1200 may run facial recognition models against the stream of image data to allow for reconfirmation of a facial recognition match. In some instances, both RC-IDAAN 1200 and IDAAN 1100 may run the same facial recognition model, and in other instances, they may run different facial recognition models. In this way, RC-IDAAN 1100 and/or IDAAN 1200 allows for data to be collected, processed, and used to provide insights near the point of data collection in a manner that makes it as useful as possible in real-time or near-real time. This is a significant improvement over systems in which data is collected and transmitted to a remote location for sophisticated processing in a data center or other environment.

By saving the image stream data in storage located in either or both of the RC-IDAAN 1200 and/or the IDAAN 1100, law enforcement can then go back to the image data captured during the operation to mine the data for other relevant facts. For example, a new model may be trained based on the faces of known accomplices or acquaintances and the data can be run against these newly-trained facial recognition models. This can be done simply by identifying the folder for the project through the user interface on the IDAAN 1100 and selecting the newly-trained model to apply against the data collected during the operation. The image data can be time-stamped, thereby permitting a correlation between the movements of identified people over time at the scene of the operation. Further analysis can be performed on the data and the data collected and stored during the operation may be archived at a later time by off-loading the data from the IDAAN 1100 and/or RC-IDAAN 1200 onto a computer system over network connection. Such a network connection may be through Internet 1004, or through a LAN, WAN, or other connection as appropriate. Data stored during an operation such as the one described above may be stored in networked storage 1600 and operated on by computer system 1700 at a later time after the operation has concluded.

The foregoing is just one example of a use-case for the system and methods disclosed herein. Those skilled in the relevant technology will understand that the potential applications of the systems and methods disclosed herein are too numerous to describe in their entirety. Indeed, numerous sensors may be used to provide data to the RC-IDAAN 1200 and/or IDAAN 1100 to allow the system to apply the collected data against various models to gain insights. For example, sensor coupled to RC-IDAAN and/or IDAAN include motion sensors, liquid-level sensor, flowrate sensors, gyroscopes, biometric sensors, among others. Other sensors, including custom-designed sensors may be employed. For example, in a tactical environment, such as a battlefield theater, sensors may be deployed on soldiers' weapons to track the rate at which soldiers are using ammunition. The data can be collected by a sensor located on the weapon and reported back to the RC-IDAAN 1200 and/or IDAAN 1100 so that an alert may be issued to allow strategic deployment of additional ammunition to identified soldiers. Numerous additional applications will be readily apparent.

Model store 1500 can be configured to allow third parties to provide containerized models and make them available to users of the system to download and use either with or without having to purchase or license those models. Models in model store 1500 may be provided as part of a purchase of particular sensors to be paired with the systems disclosed herein. Models may be obtained from the model store and used locally in an offline environment even in situations where a network or Internet connection is unavailable or simply not used. The model store allows for third party developers to develop models to process specific forms of data obtained from a wide variety of sensors thereby creating sensor-model pairs that can be made available to end-users for a vast number of potential applications.

Figure 2:
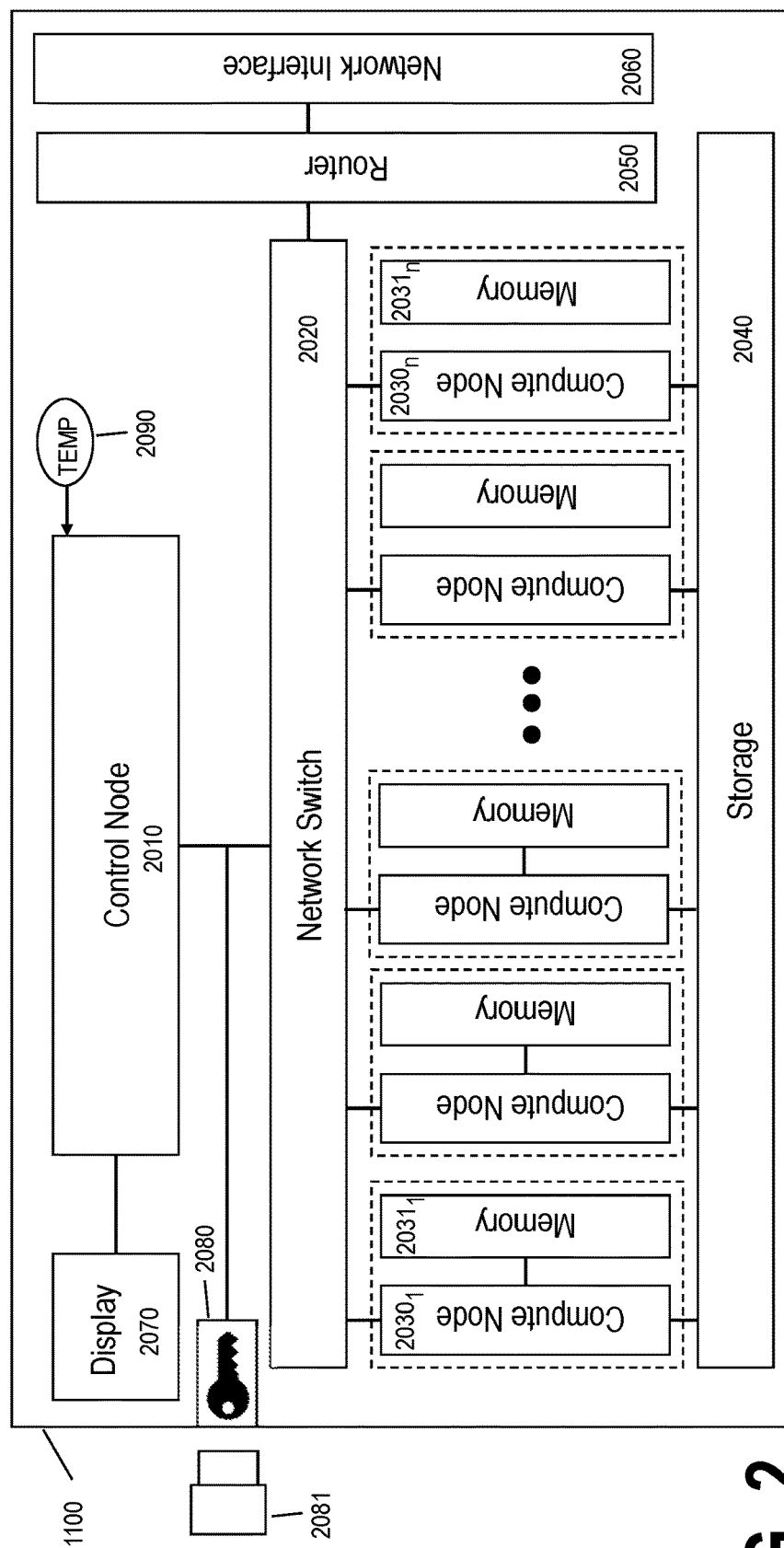
FIG. 2 is a block diagram showing certain components of an exemplary implementation of an IDAAN according to aspects of this disclosure.

FIG. 2 is a block diagram showing certain components of an exemplary implementation of an IDAAN 1100 according to aspects of this disclosure. The IDAAN 1100 may be implemented as a centralized container orchestration system used for the deployment, scaling, and management of applications and data models within the system. According to one example, the IDAAN 1100 may be regarded as a centralized Kubernetes cluster and a control node 2010 may be configured to perform orchestration among a plurality of subordinate compute nodes $2030_1$ to $2030_n$. The use of a centralized container orchestration system can enable the IDAAN 1100 to have a consistent and reliable method for deploying a wide range of applications such as models to the IDAAN 1100. The centralized container orchestration system can provide application programming interfaces (APIs) allowing the IDAAN 1100 to invoke the system's functions without the user knowing how to program in the centralized container orchestration system's language or be skilled at deploying Kubernetes. Instead, a dashboard may be provided on display 2070 that presents a user with a user interface that allows the user to easily start a data model application, which causes the IDAAN 1100 to launch the model and start with centralized container orchestration system without the user needing to know the complex applications that are running on the IDAAN 1100.

The plurality of subordinate compute nodes $2030_1$ to $2030_n$ may include an associated memory $2031_1$ to $2031_n$. The plurality of subordinate compute nodes $2030_1$ to $2030_n$ are coupled to storage 2040. The storage 2040 may be managed by a storage manager within the IDAAN 1100. Storage 240 may be configured as a storage array and may be configured to be accessed by the plurality of subordinate compute nodes $2030_1$ to $2030_n$ and may be shared among subordinate compute nodes of the plurality of subordinate compute nodes $2030_1$ to $2030_n$.

Storage 2040 may be configured to be one or more empty storage drives upon system initialization. According to this example, storage 2040 may be unformatted when the system is first powered on. According to one embodiment, the operating system may be installed to local nonvolatile memory (NVMe) drives coupled directly or indirectly to the subordinate compute nodes $2030_1$ to $2030_n$. Implementing storage and the installation of the operating system in this manner can allow the machine file system and the storage functionality to be implemented separately within IDAAN 1100.

After the plurality of subordinate compute nodes $2030_1$ to $2030_n$. have been built out with their operating systems, components of the container orchestration system can be loaded onto one or more of the plurality of subordinate compute nodes $2030_1$ to $2030_n$. For instance, Kubernetes can be loaded onto one or more of the plurality of subordinate compute nodes $2030_1$ to $2030_n$ to form worker nodes under control of the control node 2010, which may be a Kubernetes master node. The centralized container orchestration system can be configured to tie into the host networking by creating virtual network interfaces to access the various subordinate compute nodes $2030_1$ to $2030_n$.

According to one example, the control node 2010 may be implemented as one or more small board computers (SBCs). For instance, control node 2010 may be implemented using a Raspberry Pi. The control node 2010 may employ a provisioning construct to facilitate and automate deployment and dynamic provisioning of computing environments, thereby permitting the coordination of applications and workloads across the subordinate compute nodes $2030_1$ to $2030_n$. The provisioning software may be responsible for DHCP, DNS, and installation of the operating systems for the plurality of subordinate compute nodes $2030_1$ to $2030_n$. According to one example the operating system may be a Ubuntu Linux operating system and the provisioning construct may be Metal as a Service (MAAS). Each of the subordinate compute nodes $2030_1$ to $2030_n$ may be configured to network boot, and then is controlled by the provisioning software executed by the control node 2010 in terms of file system configuration, network configuration, and DNS.

Additionally, one or more of the plurality of subordinate compute nodes $2030_1$ to $2030_n$ may include an instance of a software-based redundant array of inexpensive disks (RAID) application. The RAID application may provide a flexible and reliable way to manage redundant storage of data by one or more of the plurality of subordinate compute nodes $2030_1$ to $2030_n$. According to one exemplary implementation, the software-based RAID application may be CEPH. The software-based RAID application may be deployed within the container orchestration system. For example, according to one implementation, CEPH may be deployed within Kubernetes executing on one or more of the plurality of subordinate compute nodes $2030_1$ to $2030_n$.

According to one implementation, the traffic that is used for redundant storage functionality by the software-based RAID application uses a first physical interface. This first physical interface may be different from the physical interface used by traffic from the collection, analysis, dissemination, and container orchestration within the IDAAN 1100. According to this example, there may be two physical interfaces on each of the plurality of subordinate compute nodes $2030_1$ to $2030_n$ In this way, storage-related traffic may be managed within the IDAAN 1100 separately from traffic related to other data processing functionalities leading to increased efficiencies in the management of networked traffic through the IDAAN 1100. Network separation can permit bandwidth efficiencies and can avoid having the storage-related traffic (data and management overhead) interfere with the container orchestration-related data, thus giving rise to bandwidth efficiencies within the IDAAN 1100.

According to one example, each of the plurality of subordinate compute nodes $2030_1$ to $2030_n$ deployed for the performance of specified tasks can have its own IP address to provide a management interface, and a separate IP address for the storage interface. Additionally, the instance of the container orchestration system may have a third IP address.

Each of the subordinate compute nodes $2030_1$ to $2030_n$ can be interconnected with the control node 2010 and the other subordinate compute nodes through a network switch 2020. Network switch 2020 may be a gigabit network switch according to one exemplary implementation. The network switch 2020 can include a port configured as an uplink and provide power-over-ethernet to the router 2050. Router 2050 is configured to control the flow of traffic being input into the IDAAN 1100 via the network interface 2060. In one example, the router 2050 of IDAAN 1100 may have one local area network (LAN) connection port designed to interface with devices locally and a wide area network (WAN) port designed to provide upstream connections to other networks, such as the Internet or an intranet. According to certain implementations, the remainder of the ports of the network switch 2020 are not given specific configurations. This can enable separation of logical traffic based on machine address.

The foregoing components of the IDAAN 1100 may be selected to minimize their form factor while maximizing their capacity, compute power, and energy efficiency. The various components of the IDAAN 1100 may be chosen such that they may be disposed within a portable case that may be carried by one or more handles by a single person. Additionally, or in the alternative, the components of the IDAAN 1100 may be disposed with a portable case that includes a handle and wheels, allowing it to be pulled by a single person.

The various components may be configured as part of cassettes disposed within the portable case containing the IDAAN 1100. For example, the portable case may include a cassette including all of the compute nodes such as control node 2010 and the subordinate compute nodes $2030_1$ to $2030_n$. Additionally, a network cassette or sled may include router 2050, network interface 2060, and network switch 2020. A storage cassette can include all of the storage 2040, which may be configured as a single drive or multiple drives. This type of modular design can allow for the rapid interchange of components either for purposes of replacement or upgrade. This may facilitate easy repair, upgrade, or replacement of components in potentially austere environments within personnel having minimum training related to building and maintaining computer systems.

The portable case containing the IDAAN 1100 may include a thermostat 2090. The thermostat is used to detect the temperature within the portable case housing the IDAAN 1100. The sensed temperature may be provided to control node 2010 and control node may be configured to selectively apply power to one or more fans within the portable case to cause air to be exhausted through ducts built into the portable case. According to one implementation, the fans within portable case are server-grade fans. The portable case can be configured to include two ducts, one to bring cooler air into the portable case and the other to exhaust warmer air out of the portable case. Other cooling techniques such as the use of heat sinks may also be used in the portable case. According to an embodiment of the system disclosed herein, the components may be arranged within the portable case to facilitate airflow through the portable case in the cool-to-hot direction.

The IDAAN 1100 may also be configured to include an ignition key port 2080. The ignition key port 2080 may be configured to receive an ignition key 2081. The ignition key 2081 can include a memory space and an encryption key may be stored in the memory space. The ignition key 2081 and the ignition key port 2080 can be used to provide a level of security to the data included in storage 2040. In the event that the IDAAN needs to be abandoned or left unattended, the operator simply removes the ignition key 2081 from the ignition key port 2080 and can leave the IDAAN behind. The drives in the IDAAN can be encrypted such that their contents are inaccessible without the presence of the ignition key 2081 or the appropriate decryption keys stored in another computer system. The ignition key 2081 and the ignition key port 2080 may be used to allow a user to quickly remove the encrypted file system root of each machine. The ignition key 2081 may be configured at the time of installation of the operating system with the operating system root partitions, such that when they are remoted, they remove the encryption keys to access the rest of the storage in the system. According to one manner of implementing the ignition key 2081 and the ignition key port 2081, these devices may be implemented according to the USB specification.

IDAAN 1100 may also include a display 2070. Display 2070 may be a touch screen display and allow the user to interact with the IDAAN 1100 to allow for connecting devices, viewing models in the model store, managing models executed by IDAAN 1100. Display 2070 can be used to provide an intuitive, user-friendly interface. This can allow a user to use a dashboard presented on display 2070 to deploy applications and operate on large sets of data, in real-time or near-real time proximate to the point of collection without having to have the knowledge of how to deploy complex software that might be found in datacenters and available in the context of cloud applications.

Figure 3:
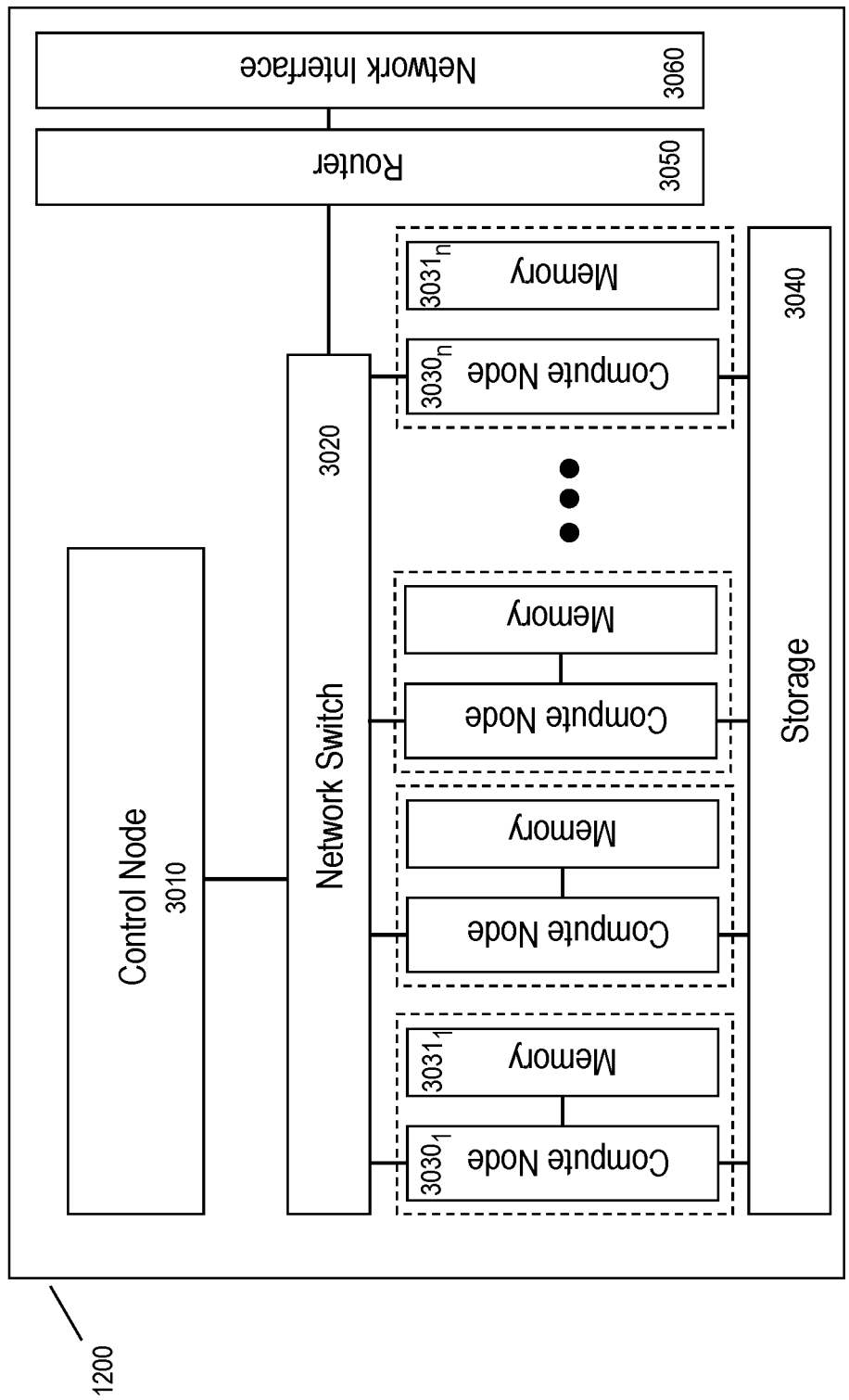
FIG. 3 is a block diagram showing certain components of an RC-IDAAN according to an exemplary implementation of an RC-IDAAN according to aspects of this disclosure.

FIG. 3 is a block diagram showing certain components of an RC-IDAAN according to an exemplary implementation of an RC-IDAAN according to aspects of this disclosure. In the context of this disclosure, the concept of a reduced capacity IDAAN is intended to be presented in an expansive manner as a way to distinguish between an IDAAN and a more portable unit that may be carried, for example, in a backpack, briefcase, or satchel, for example (though the unit may be mounted on a vehicle or other mobile or stationary object). The reference to user-portable devices is not intended to limit the means for using the RC-IDAAN or IDAAN in manners that are otherwise consistent with this disclosure. The concept of a reduced-capacity IDAAN may take many different forms. For example, in one example, the RC-IDAAN 1200 maybe considered to be a reduced-capacity IDAAN 1200 because it lacks a touch screen display according to certain examples. In an alternative embodiment, RC-IDAAN 1200 may include a touch screen display (not shown), but the touch screen display may be smaller than the touch screen display on IDAAN 1100. The RC-IDAAN 1200 may have fewer subordinate compute nodes 30301 to 3030n or may have less memory associated with the compute nodes $3031_1$ to $3031_n$.

The functionality of the control node 3010, the plurality of subordinate compute nodes $3030_1$ to $3030_n$, memory $3031_1$ to $3031_n$, network switch 3020, router 3050, network interface 3060, and storage 3040 within the RC-IDAAN 1200 is configured and operates in generally the same manner as the IDAAN 1100. According to certain embodiments, RC-IDAAN 1200 need not include the ignition key port and ignition key. Alternatively, although not shown, RC-IDAAN may be configured to include an ignition key and an ignition key port in a similar manner to how these components are used in the IDAAN 1100. According to one variant, storage 3040 of the RC-IDAAN 1200 may be USB-based storage drives plugged into the individual subordinate compute nodes $3030_1$ to $3030_n$. According to one embodiment, the RC-IDAAN may include batteries, wireless charging facilities such as an induction coil may be placed on a main chassis, and a compute cassette can be configured to be held on the main chassis via magnets. A wireless networking bridge be disposed in the lid of the case opposite from the main chassis and compute cassette.

The components of the RC-IDAAN 1200 may be configured to be disposed within a portable housing. According to one example, the portable housing may take on a smaller form-factor than the portable case occupied by the components of the IDAAN 1100. This may make RC-IDAAN 1200 more portable or more easily concealable or stowable than the IDAAN 1100. The RC-IDAAN 1200 may be configured to permit wireless charging of a battery within a hermetically sealed case.

According to one exemplary implementation, when the RC-IDAAN 1200 is powered on, a wireless communication link can automatically be created between the RC-IDAAN 1200 and the IDAAN 1100. In certain implementations, the wireless connection will pick an optimal communication channel from among a plurality of potential communication channels. The user of an IDAAN 1100 may add the RC-IDAAN 1200 to the network using instructions or controls provided via display 2070 on the IDAAN 1100. For example, when a user wants to add the RC-IDAAN 1200 to the IDAAN 1100, the user may select an "add remote compute device" software switch on the display 2070 through dashboard. Doing so will allow the creation of a new cluster managed by control node 2010. RC-IDAAN 1200 may include its own centralized container orchestration system and software-based RAID storage application. When an RC-IDAAN 1200 is added to the IDAAN 1100 the centralized container orchestration system of the IDAAN 1100 can be configured to manage the local clusters contained in the RC-IDAAN 1200 as if they were subordinate compute nodes included within the IDAAN 1100. Therefore, an application deployed from the IDAAN 1100 can be deployed on the RC-IDAAN 1200. The opposite is also true. An application deployed from the RC-IDAAN 1200 may be managed by the control node 3010 on the RC-IDAAN 1200 and executed on the IDAAN 1100. According to one exemplary implementation, application deployment and management may be performed using the IDAAN 1100. According to another exemplary implementation the RC-IDAAN 1200 may be configured to manage and deploy applications under the control of control node 3010 using the plurality of subordinate compute nodes $3030_1$ to $3030_n$ even when the RC-IDAAN 1200 is not operating under the control of IDAAN 1100's control node 2010.

Figure 4:
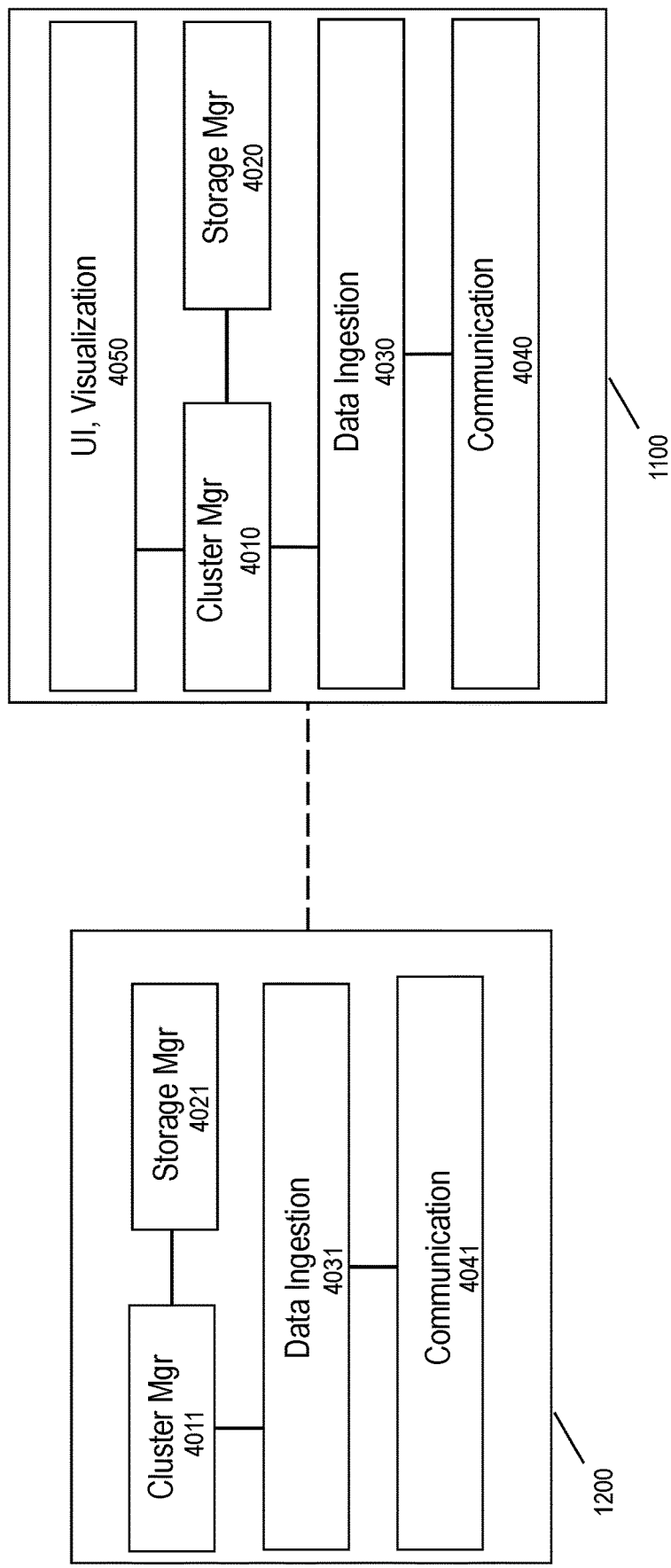
FIG. 4 is a block diagram of certain aspects of a software architecture employed by an IDAAN and an RC-IDAAN according to aspects of this disclosure.

FIG. 4 is a block diagram of certain aspects of a software architecture employed by an IDAAN 1100 and an RC-IDAAN 1200 according to aspects of this disclosure. Exemplary implementations of the applications and techniques are described in connection with the discussion of FIGS. 1-3 above. The IDAAN 1100 and RC-IDAAN 1200 may include communication or network layer applications 4040, 4041 to manage the flow of data through the IDAAN 1100 and RC-IDAAN 1200, respectively. Additionally, the IDAAN 1100 and RC-IDAAN 1200 may be configured to include one or more data ingestion layer applications 4030, 4031 which control the acquisition and processing of data before it is input into one or more applications for processing data or storing it. Additionally, the IDAAN 1100 and RC-IDAAN 1200 may each include a cluster manager 4010, 4011, such as the centralized container management system described above. IDAAN 1100 and RC-IDAAN 1200 may also include a storage manager 4020, 4021 configured to manage data storage within each of the IDAAN 1100 and RC-IDAAN 1200. According to certain implementations, the IDAAN 1100 may have a user interface (UI) or visualization application layer 4050, which provides a user interface to provide a convenient, user-friendly way to abstract the complex processes being executed on IDAAN 1100. While RC-IDAAN 1200 is shown without a UI and visualization application, those skilled in the art will understand that according to other embodiments, RC-IDAAN 1200 may include such a layer and may display data to a user and allow the user to manage the RC-IDAAN 1200's functionalities via a display, such as a touch-screen display. According to another exemplary embodiment, a UI/visualization application may be provided using a paired mobile device which can allow the user to use a touch screen on, for example, a smart phone to control the functionality of the RC-IDAAN 1200 or IDAAN 1100.

Figure 5:
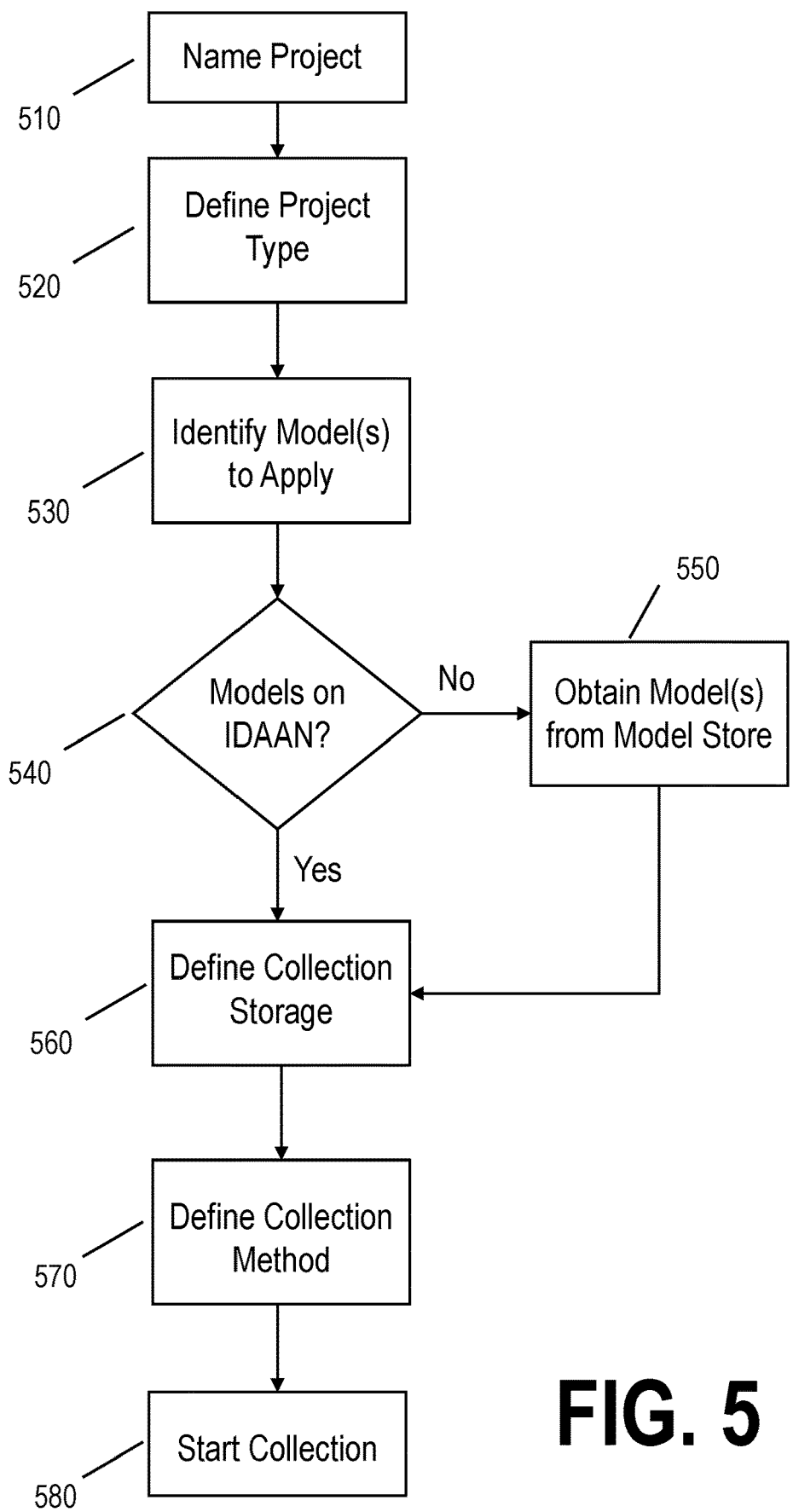
FIG. 5 is a depiction of an exemplary workflow for the creation of a data collection in connection with an exemplary system according to aspects of this disclosure.

FIG. 5 is a depiction of an exemplary workflow for the creation of a data collection in connection with an exemplary system according to aspects of this disclosure. To create a data collection according to one process used in connection with a system according to embodiments disclosed herein a user will be prompted to enter a name for a data collection project. The user enters a name for the project 510. The user will then be asked to define the type of project. While there are various ways of presenting choices for the user regarding the project type, one example, may be a list of different project types presented to the user on a GUI from which the user can select a project type by pressing a soft switch on the touch screen display. Of course, other input mechanisms may be used without departing from the scope and spirit of the embodiments disclosed herein. For example, the user may define a project type 520 such as a text project, a video project, an image-based project, a location-based project (e.g., using latitude and longitude or geoposition data), an audio project, or other type of project. Once the user defines the type of project 520, the IDAAN 1100 may be configured to define appropriate visualizations for the project type selected by the user. As will be understood from the description herein, numerous project types are possible depending on the nature of the data to be collected and processed. Once the project has been named 510 and the type project defined 520, the user may then identify one or more models to be applied to the data 530. The IDAAN 1100 or RC-IDAAN 1200 may be configured to display available models for the particular selected collection type to the user. In this way the user may be presented with a choice of models associated with processing video data (e.g., the identification of license plates or facial recognition) when the collection type is video. A determination may be made about whether the models are already included on IDAAN 1100 or RC-IDAAN 1200 as shown at step 540. If they are not, then the appropriate containerized model(s) may be obtained from the model store 550. If the model(s) are already installed on the IDAAN 1100 or RC-IDAAN 1200, then the process can proceed to defining the collection storage 560. As part of this process, the orchestration system may be called by a dashboard and may automatically provision object storage to define a location to store the collection. In this way a persistent volume may be created as an object via the software-based RAID application. This can allow the persistent volume to be presented to the container as a particular file system path mounted internally to the container for applications to interact with. According to certain embodiments, the models may need to be trained using training data sets in manners that are familiar to those skilled in the art. After the collection storage has been defined, the collection method can be defined 570. Then, the collection can be started as shown in more detail in FIG. 6.

Figure 6:
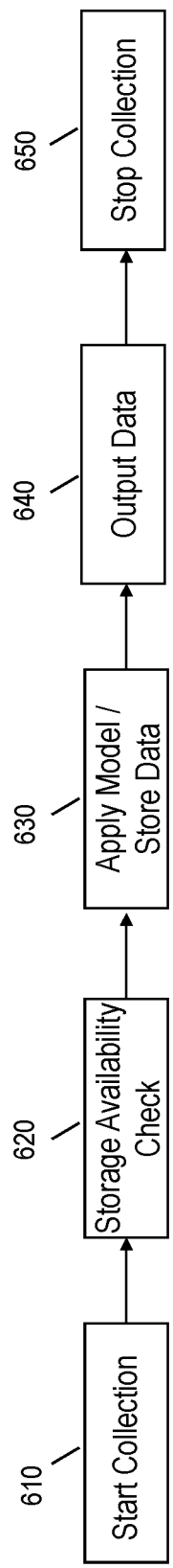
FIG. 6 is a depiction of an exemplary workflow to commence a data collection using a system according to aspects of this disclosure.

FIG. 6 is a depiction of an exemplary workflow to commence a data collection using a system according to aspects of this disclosure. As explained in connection with FIG. 5, the user may start the data collection 610. After the user starts the data collection 610, the IDAAN 1100 or RC-IDAAN 1200 may verify that the collection devices assigned by the storage manager application is alive and reachable through the networking within the IDAAN 1100 or RC-IDAAN 1200 as reflected in step 620. Once it is determined that the collection devices are alive and reachable, data may be ingested, and applied against a model and/or stored in the assigned collection devices as shown in step 630. The model may be configured to display a live feed of information regarding the data collection via an API so that a user can track the collection via a user interface or on an attached smart phone application. The raw data may be output as reflected in step 640. Additionally, data resulting from the processing of the raw data against the model may also be output as part of step 640. The data may be output to a folder associated with the collection. In certain use cases, the data may be stored without processing it against any models. In use cases in which the raw data is processed against a model, the processed data may be forked from the data stream against which the model is applied and the raw data can be stored independently of the model output data. The collection may continue to run until the collection is stopped, step 650. In carrying out these processes, the IDAAN 1100 may be configured to provide the user with a data collection dashboard on display 2070.

Figures 7, 8:
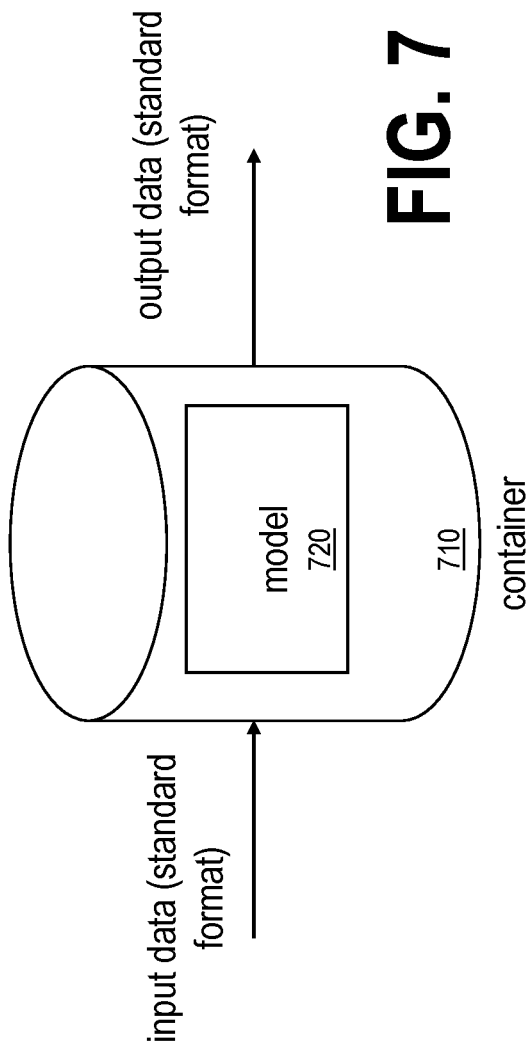
FIG. 7 shows a containerized model that may be applied by the system according to aspects of this disclosure.
FIG. 8 shows an example of a data format for data collected by the sensor bridge and output in a common data format.

FIG. 7 shows a containerized model that may be applied by the system according to aspects of this disclosure. As explained above, models may be containerized so that their innerworkings may be abstracted within the system. In this schematic, model 720 is illustrated as being disposed within a container 710. The container 710 may be a wrapper that can receive input data in a standardized data format and may convert the data in the standardized data format into a data format that may be unique to the model 720. After the model has processed the raw data converted from the standard format into the model-specific format the output data from the model's output may be once again reformatted to a standardized format for storage in a folder associated with the project and collection.

FIG. 8 shows an example of a data format for data collected by the sensor bridge and output in a common data format. In some instances, analog data may be output by a sensor. Therefore, according to one aspect of the disclosure, a sensor bridge may be used to collect analog data from an analog sensor and convert it into a common format for inputting the data into a containerized model. For instance, the sensor bridge may include an analog connection interface and an analog-to-digital converter configured to receive analog sensor data and to output digital data collected over time intervals as described earlier in this disclosure. The digital data may be processed into a data format that is agnostic to the type of analog sensor data being received. The output data format may be a JSON data format. As shown in FIG. 8, the data may be arranged as a time-series of data collected at different times. For instance, different collection times ("tcollected") may be associated with data received at different analog connections. For instance, the sensor bridge may have four analog pins according to one exemplary implementation. Those four analog pins (p0, p1, p2, and p3) may receive voltages, which are converted to digital voltage measurements. In this example, at time 161895479, the voltage applied to pin p0 was 1, and the voltage on the three other pins was zero. This data is converted from analog form into a digital form, and arranged as a collection of data associated with the specific time interval. A predetermined amount of time later, at time 161895480, the voltage on p0 is 3, and is still zero on the remaining pins. This data is again concerted into a standardized format as shown in FIG. 8. This process continues over a period of time as a stream of time-resolved data is collected from the analog sensor, converted into a standardized data format, and provided to the IDAAN 1100 or RC-IDAAN 1200 for further processing. This standardized data format allows for a large variety of analog sensor data to be collected and applied against data models proximate to the point of data collection.

Figure 9:
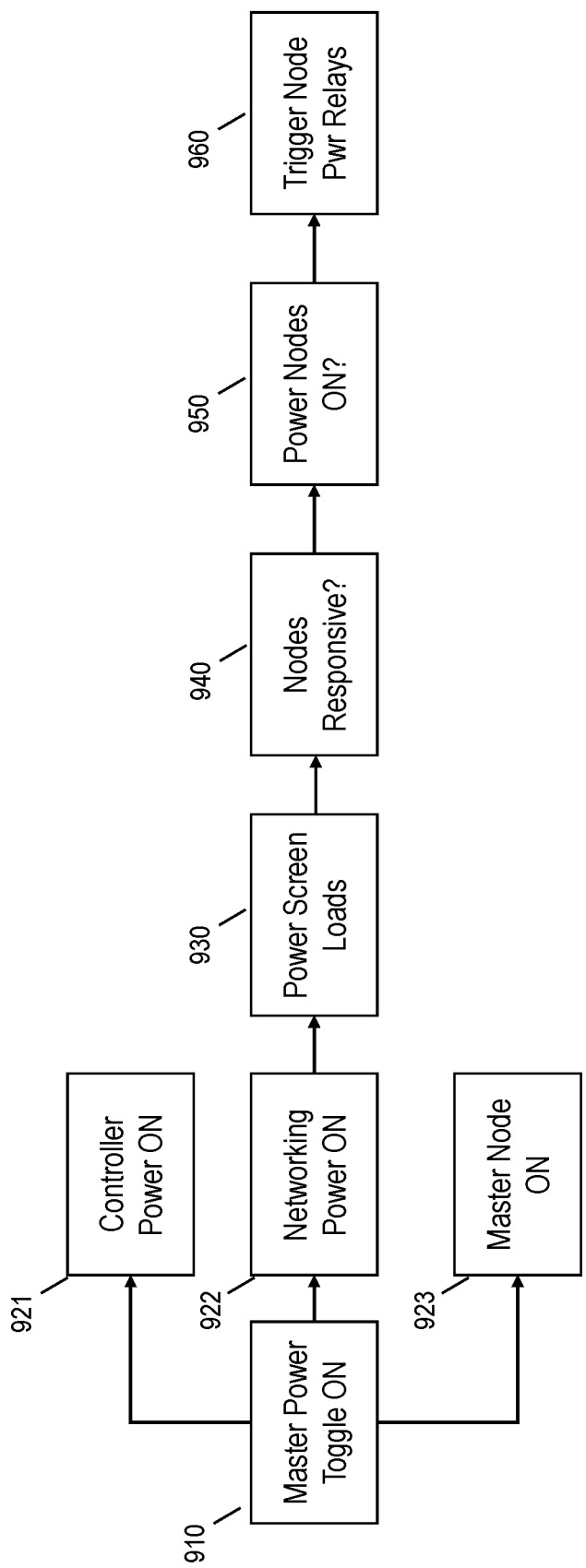
FIG. 9 shows a power-on sequence for an IDAAN according to aspects of this disclosure.

FIG. 9 shows a power-on sequence for an IDAAN according to aspects of this disclosure. Powering up an IDAAN 1100 can employ the exemplary boot technique shown in FIG. 9. When a user toggles master power switch on as shown in step 910, the controller powers on, 921, the networking powers on, 922, and the master control node powers on, step 923. In this context, the controller can provide the overall control interface (e.g., a touchscreen) and corresponding machine (e.g., the control node) that the user may interact with. The controller may include user interface instructions and instructions to control the power on and power on processes, among other things. A power screen may load on the display as shown in step 930. A system check may be performed to determine whether any subordinate compute nodes are responsive as shown in step 940. The user may be presented with an option to power subordinate computer nodes on as shown in step 950. In an alternative implementation, the plurality of subordinate compute nodes may be powered on automatically as part of the boot process. The automatic process may trigger node power relays to be switched into an "on" position. After these steps are completed, the power-on sequence for the IDAAN 1100 may be completed.

Figure 10:
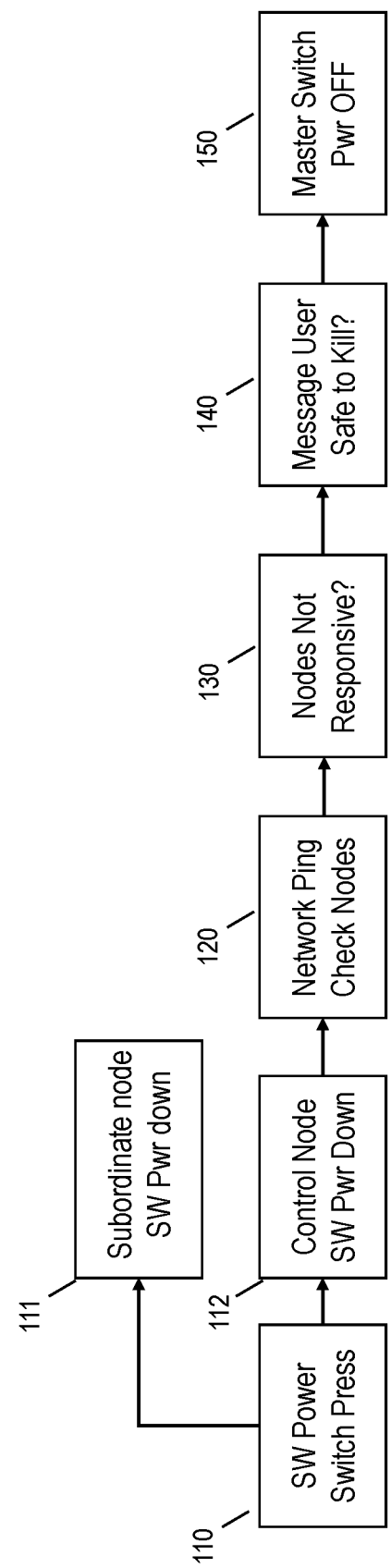
FIG. 10 shows a power-off sequence for an IDAAN according to aspects of this disclosure.

FIG. 10 shows a power-off sequence for an IDAAN according to aspects of this disclosure. A user may be presented with a software-based switch on the display allowing the user to commence a power-down sequence. When the user presses a soft switch associated with the power-down sequence as shown in step 110, the software on the control node of the IDAAN powers down as shown as step 112 and the software on the subordinate compute nodes powers down as shown in step 111. To check to ensure that the nodes have powered down, the networking pings the nodes as shown in step 120. In step 130, the networking ensures that the nodes have powered down when the nodes are not responsive to the ping. The display may then present a message to a user indicating that the node is powered down and that it is safe to kill the master power as shown in step 140. When the master power switch is shut off, the networking is then shut down at step 150.

Figure 11:
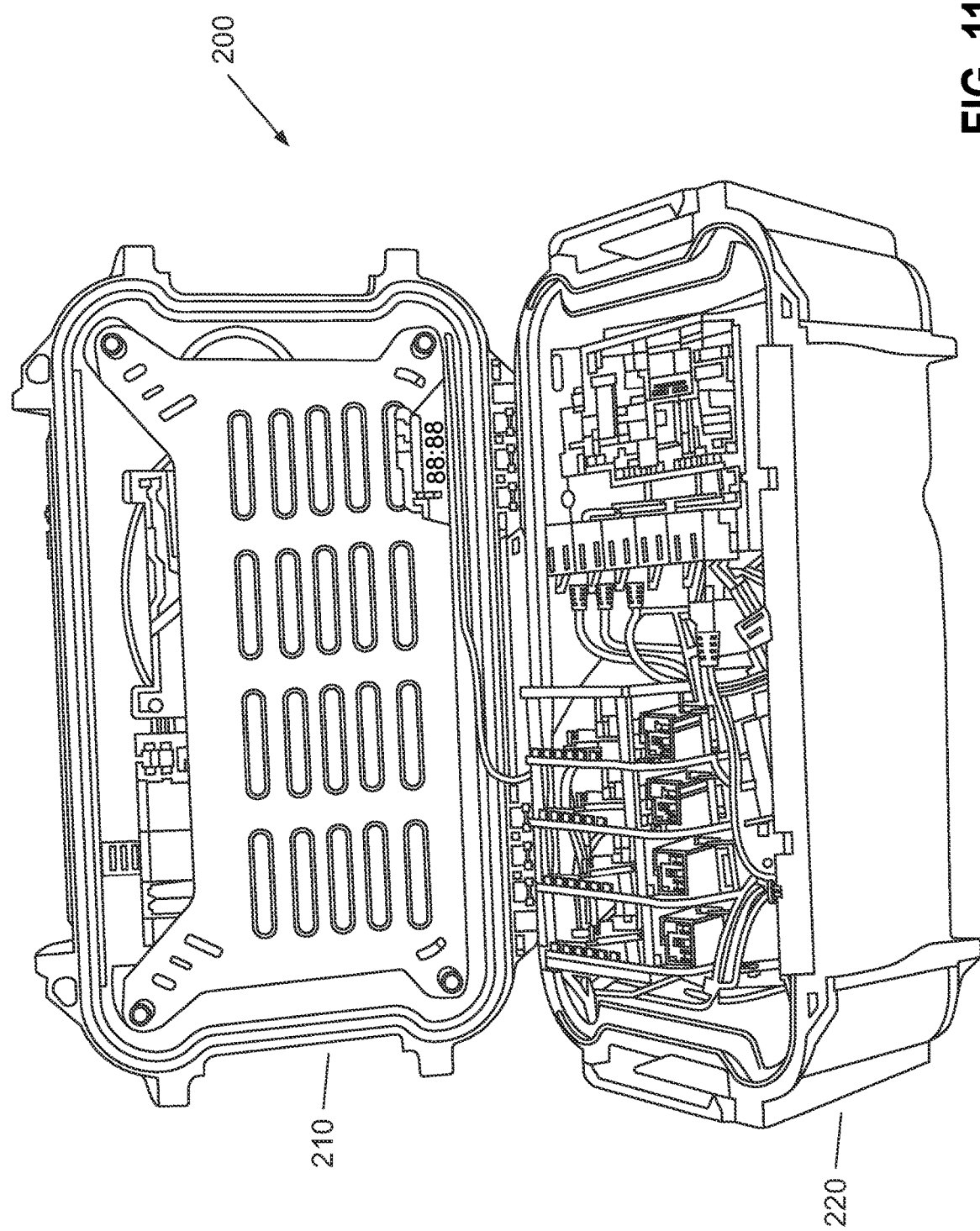
FIG. 11 shows an example of an RC-IDANN in a portable case according to aspects of this disclosure.

FIG. 11 show an example of an RC-IDANN in a portable case according to aspects of this disclosure. The RC-IDAAN may be disposed in a sealed ruggedized case 200. The case may include a top portion 210 and a bottom portion 220. The top portion may house the networking functionality while the bottom portion houses the compute cassette and a storage cassette.

Figure 12:
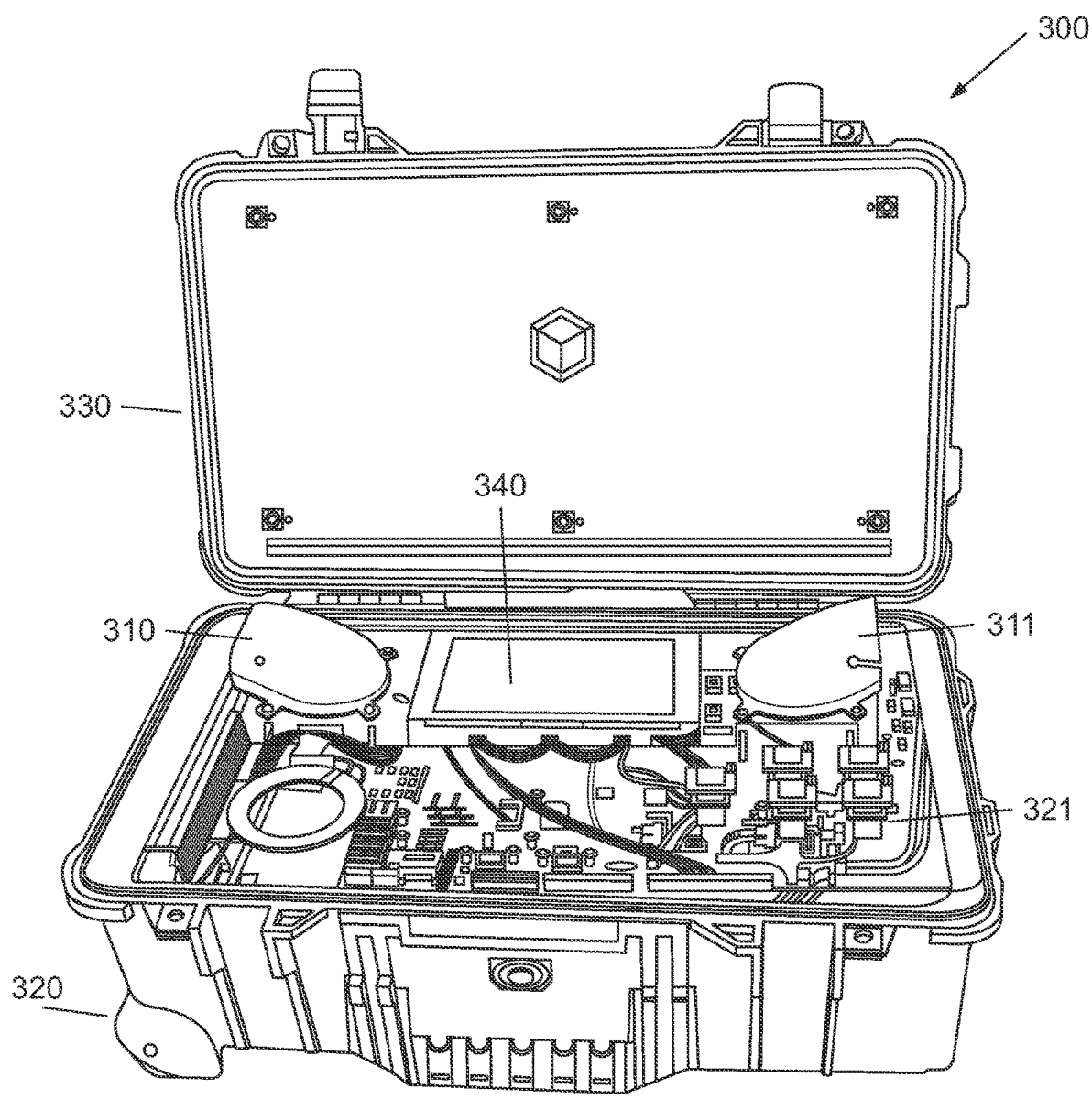
FIG. 12 shows and example of an IDAAN in a portable case according to aspects of this disclosure.

FIG. 12 show and example of an IDAAN in a portable case according to aspects of this disclosure. The IDAAN may be disposed of in a ruggedized case 300. The ruggedized case may include a top portion or lid 330 and a bottom portion 320. The bottom portion 320 may house electronics including display 340, various cassettes and networking equipment as described above, and ignition keys and ignition key port (collectively items 321). The housing may also include air inlet 310 and outlet 311 ports for cooling purposes.

While certain examples have been provided in this disclosure, those skilled in the art will appreciate from this disclosure that the use of the systems and methods disclosed herein will have uses beyond those examples. For instance, while an example is described about the use of certain systems and methods as part of a tactical law enforcement operation, it will be apparent that the disclosed systems and methods will be useful in managing logistics in a wide variety of environments such as shipping, inventory management, supply chain management, food service, among others because of the versatility that the disclosed systems and methods enable.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

I claim:

1. An isolatable data aggregation and analytics node (IDAAN) system comprising:
   an external network interface configured to receive data from a reduced capacity isolatable data aggregation and analytics node (RC-IDAAN) proximate to the IDAAN over a local network connection, wherein the data comprises data related to data processing functionalities of the IDAAN;
   a control node configured to execute a cluster manager and a storage manager;
   a first plurality of subordinate compute nodes configured to execute tasks under control of the cluster manager, wherein at least one of the first plurality of subordinate compute nodes comprises:
      an instance of a software-based redundant array of inexpensive disks (RAID) application;
      a first interface associated with a first IP address, the first interface for receiving storage-related traffic used by the RAID application; and
      a second interface associated with a second IP address different than the first IP address, the second interface for receiving the data related to the data processing functionalities of the IDAAN, wherein the data related to the data processing functionalities of the IDAAN is different than the storage-related traffic;
   the storage manager configured to manage storage of the data received by the system IDAAN across one or more storage devices shared by the first plurality of subordinate compute nodes;
   wherein the IDAAN is configured to manage one or more second compute nodes within the RC-IDAAN such that the one or more second compute nodes within the RC-IDAAN are subordinate to the control node of the IDAAN; and
   a network switch configured to route the data received by the IDAAN between at least two of: the external network interface, the control node, and the first plurality of subordinate compute nodes.

2. The IDAAN of claim 1 wherein the local network connection is a wireless local network connection.

3. The IDAAN of claim 1, wherein the control node, first plurality of subordinate compute nodes, the external network interface, and the network switch are configured and sized to be disposed within a portable case.

4. The IDAAN of claim 3, wherein the IDAAN further comprises:
   a heat management system including a temperature sensor, a fan, and a heat discharge duct to the exterior of the portable case, wherein the heat management system is operated under the control of the control node.

5. The IDAAN of claim 1, wherein the IDAAN further comprises:
   an ignition key port, the ignition key port being configured to receive an ignition key having a memory space and an encryption key stored in the memory space, wherein the IDAAN will not permit access to the one or more storage devices shared by the first plurality of subordinate compute nodes unless an ignition key is inserted into the ignition key port.

6. The IDAAN of claim 1, further comprising:
   a wide area network connection port associated with the IDAAN; and
   a display;
   wherein the IDAAN is configured to allow a user to access a model store using the display as an interface to allow the user to identify, select, and download models to be applied to data received from the RC-IDAAN proximate to the IDAAN over the local network connection.

7. The IDAAN of claim 1, wherein data received by the RC-IDAAN over the local network connection can be aggregated and processed without a connection to a wide area network.

8. The IDAAN of claim 1, wherein data received from the RC-IDAAN proximate to the IDAAN over the local network connection is aggregated and processed proximate to a point of data collection by the IDAAN.

9. The IDAAN of claim 1, wherein the RC-IDAAN comprises:
   a second control node configured to execute:
      a second cluster manager; and
      a second storage manager; and
      the one or more compute nodes comprises a second plurality of subordinate compute nodes configured to execute tasks under the control of the second cluster manager, wherein the second cluster manager is configured to be controlled by the IDAAN;
   wherein the second storage manager is configured to manage storage of data received by the RC-IDAAN across storage shared by the second plurality of subordinate compute nodes;
   a second network interface configured to interface with a sensor over a personal area network, receive sensor data from the sensor, and to transmit sensor data over the local network connection to the IDAAN; and
   a second network switch configured to route the sensor data between the second network interface, the second control node, and the plurality of subordinate compute nodes.

10. The IDAAN of claim 9, wherein one or more of the IDAAN and the RC-IDAAN is configured to:
    process received sensor data against a model;
    determine an occurrence of an event; and
    transmit an indication of the event to a user.

11. The IDAAN of claim 9, the sensor being coupled to a sensor bridge, the sensor bridge comprising:
    an analog connection interface; and
    an analog-to-digital converter configured to receive analog sensor data and to output digital data in a data structure representing sensor data collected over time intervals, wherein the data structure is agnostic to the type of analog sensor data received.

12. The IDAAN of claim 1, wherein the control node is configured to:
    load a containerized model, the containerized model being configured to receive data having an input data format and output data having an output data format; and
    orchestrate application of the model by one or more subordinate compute nodes of the first plurality of subordinate compute nodes of the IDAAN, wherein containerization of the model abstracts the model from the hardware and software running on the control node and one or more of the first plurality of subordinate compute nodes of the IDAAN.

13. The IDAAN of claim 1, wherein the one or more second compute nodes within the RC-IDAAN are subordinate to the control node of the IDAAN to permit deployment of an application to the RC-IDAAN.

14. A system comprising:
an isolatable data aggregation and analytics node (IDAAN), the comprising:
a first control node configured to execute a cluster manager and a storage manager;
a first plurality of subordinate compute nodes configured to execute tasks under the control of the cluster manager, wherein at least one of the first plurality of subordinate compute nodes comprises:
an instance of a software-based redundant array of inexpensive disks (RAID) application;
a first interface associated with a first IP address, the first interface for receiving storage-related traffic used by the RAID application; and
a second interface associated with a second IP address different than the first IP address, the second interface for receiving data related to data processing functionalities of the IDAAN, wherein the data related to data processing functionalities of the IDAAN is different than the storage-related traffic;
the first storage manager configured to manage storage of the received data related to the data processing functionalities of the IDAAN across one or more storage devices shared by the first plurality of subordinate compute nodes;
a first external network interface configured to interface with a reduced capacity isolatable data aggregation and analytics node (RC-IDAAN) over a local network connection; and
a first network switch configured to route the storage-related traffic and the data related to the data processing functionalities of the IDAAN between at least two of the first external network interface, the control node, and the plurality of subordinate compute nodes;
wherein the RC-IDAAN is configured to interface with a sensor and the IDAAN, the RC-IDAAN comprising:
a second control node;
a second plurality of subordinate compute nodes;
wherein the second control node is configured to execute a cluster manager under control of the IDAAN;
a second external network interface configured to interface with the sensor over a personal area network, receive sensor data from the sensor, and transmit the sensor data over the local network connection to the IDAAN;
a second storage manager configured to manage the storage of the sensor data received by the RC-IDAAN across storage shared by qall the second plurality of subordinate compute nodes; and
a second network switch configured to route the sensor data between at least two of the second external network interface, the second control node, and the second plurality of subordinate compute nodes.

15. The system of claim 14 wherein the local network connection is a wireless local network connection.

16. The system of claim 14, wherein
the first control node, first plurality of subordinate compute nodes, the first network interface, and the first network switch are configured and sized to be disposed within a first portable case; and
the second control node, the second plurality of subordinate compute nodes, the second network interface, and second network switch are configured and sized to be disposed within a second portable case having a smaller form-factor than the first portable case.

17. The system of claim 16, wherein the IDAAN further comprises:
a heat management system including a temperature sensor, a fan, and a heat discharge duct to the exterior of the first portable case, wherein the heat management system is operated under the control of the first control node.

18. The system of claim 14, wherein the IDAAN further comprises:
an ignition key port, the ignition key port being configured to receive an ignition key having a memory space and an encryption key stored in the memory space, wherein the storage is inaccessible when the ignition key is not disposed within the ignition key port.

19. The system of claim 14, wherein the RC-IDAAN is configured to receive data from the sensor and to process the received data against a model proximate to a point of data collection.

20. The system of claim 19, wherein the RC-IDAAN is configured to:
process received sensor data against a model;
determine an occurrence of an event; and
transmit an indication of the event to a user.

21. The system of claim 14, wherein the RC-IDAAN is configured to receive data from the sensor and transmit the received sensor data to the IDAAN for processing of the sensor data against a model proximate to a point of data collection.

22. The system of claim 14, wherein the sensor is selected from the group consisting of: an image sensor, a video sensor, a motion sensor, a liquid-level sensor, a gyroscope, a biometric sensor, and a flow-rate sensor.

23. The system of claim 14, the sensor being coupled to a sensor bridge, the sensor bridge comprising:
an analog connection interface; and
an analog-to-digital converter configured to receive analog sensor data and to output digital data in a data structure representing sensor data collected over time intervals, wherein the data structure is agnostic to the type of analog sensor data received.

24. The system of claim 14, wherein the second control node is configured to execute a cluster manager under control of the IDAAN to allow an application to be deployed from the IDAAN to the RC-IDAAN.

25. A method comprising:
receiving data collected by a sensor located proximate to an isolatable data aggregation and analytics node (IDAAN), wherein the data is collected by the sensor coupled to a reduced capacity isolatable data aggregation and analytics node (RC-IDAAN), the RC-IDAAN being couplable to the IDAAN over a local network connection, and wherein the data collected by the sensor is related to data processing functionalities of the IDAAN;
routing storage-related traffic to a first interface of a first subordinate compute node of the IDAAN addressable using a first IP address, wherein the first subordinate compute node includes a software-based redundant array of inexpensive disks (RAID) application, and wherein the storage-related traffic is used by the RAID application;

routing the data collected by the sensor related to the data processing functionalities of the IDAAN to a second interface of the first subordinate compute node, the second interface being addressable using a second IP address different than the first IP address, wherein the second interface receives the sensor data, and wherein the sensor data is different than the storage-related traffic;

storing the received sensor data in storage managed by a storage manager executed by a control node within the IDAAN, wherein the storage manager manages the storage and the storage is shared by the first subordinate compute node and at least one second subordinate compute node of the IDAAN, and wherein the control node executes a cluster manager that controls execution of tasks by at least the first subordinate compute node; and providing the received sensor data to a compute cluster within the IDAAN for processing the sensor data using a model stored within the IDAAN, wherein the IDAAN is configured to manage one or more compute nodes within the RC-IDAAN such that the one or more compute nodes within the RC-IDAAN are subordinate to the control of the IDAAN, and wherein a network switch of the of IDAAN routes the received sensor data between at least two of: an external network interface of the IDAAN, the control node, and at least the first subordinate compute node.

26. The method of claim 25, wherein the RC-IDAAN receives and stores the sensor data before the sensor data is provided to the IDAAN.

* * * * *